United States Patent
Yui et al.

(10) Patent No.: US 11,855,315 B2
(45) Date of Patent: Dec. 26, 2023

(54) SEPARATOR-INTEGRATED GASKET

(71) Applicant: NOK CORPORATION, Tokyo (JP)

(72) Inventors: Hajime Yui, Fujisawa (JP); Toshihiro Shimazoe, Fujisawa (JP); Ryo Tomita, Fujisawa (JP)

(73) Assignee: NOK CORPORATION, Tokyo (JP)

( * ) Notice: Subject to any disclaimer, the term of this patent is extended or adjusted under 35 U.S.C. 154(b) by 89 days.

(21) Appl. No.: 17/193,450

(22) Filed: Mar. 5, 2021

(65) Prior Publication Data
US 2021/0280880 A1 Sep. 9, 2021

(30) Foreign Application Priority Data

Mar. 6, 2020 (JP) .................. 2020-039038

(51) Int. Cl.
*H01M 8/0276* (2016.01)
*H01M 8/0286* (2016.01)
*H01M 8/0273* (2016.01)

(52) U.S. Cl.
CPC ....... *H01M 8/0276* (2013.01); *H01M 8/0273* (2013.01); *H01M 8/0286* (2013.01)

(58) Field of Classification Search
None
See application file for complete search history.

(56) References Cited

U.S. PATENT DOCUMENTS

| | | | |
|---|---|---|---|
| 2009/0197147 A1* | 8/2009 | Fly ...................... | H01M 8/2483 277/650 |
| 2009/0239128 A1* | 9/2009 | Keyser ................ | H01M 8/0271 429/432 |
| 2013/0149630 A1* | 6/2013 | Rock .................. | H01M 8/0247 429/457 |
| 2019/0296370 A1* | 9/2019 | Koga .................. | H01M 8/0271 |

FOREIGN PATENT DOCUMENTS

| | | | |
|---|---|---|---|
| WO | 2007010914 A1 | 1/2007 | |
| WO | WO 2017/212775 | * 12/2017 | |

\* cited by examiner

*Primary Examiner* — Alix E Eggerding
(74) *Attorney, Agent, or Firm* — Harness, Dickey & Pierce, P.L.C.

(57) ABSTRACT

A separator-integrated gasket with improved productivity includes a separator main body for a fuel cell and an elastic gasket formed integrally with the separator main body. The separator main body includes a bead and a pair of protrusions located on opposite sides of the bead to block the liquid rubber applied to the bead. The gasket is formed when the liquid rubber is cured.

4 Claims, 6 Drawing Sheets

SEPARATOR-INTEGRATED GASKET

CROSS-REFERENCE TO RELATED APPLICATIONS

This application claims the benefit and priority of Japanese Application No. 2020-039038, filed Mar. 6, 2020. The entire disclosure of the above application is incorporated herein by reference.

FIELD

The present disclosure relates to a separator-integrated gasket for a fuel cell.

BACKGROUND

Conventionally, gaskets are formed on separators for fuel cells by various known methods, such as screen printing. In the art, a technique is known that forms beads on a separator and forms gaskets on these beads to enhance the sealing property.

Referring to FIGS. 8A and 8B, a separator-integrated gasket of a conventional example is now described. FIGS. 8A and 8B are schematic cross-sectional views of a separator-integrated gasket of a conventional example. FIG. 8A shows a case in which a gasket is properly formed, and FIG. 8B shows a case in which a defect occurs in the manufacturing process.

A separator-integrated gasket 500G includes a separator main body 500 for a fuel cell and an elastic gasket 550 formed integrally with the separator main body 500. The separator main body 500 has a bead 510. The elastic gasket 550 is formed on the bead 510, enhancing the sealing property. To enhance the sealing property, the gasket 550 needs to be formed in the correct position on the bead 510 with an intended height t. The gasket 550 is typically formed by curing liquid rubber. Liquid rubber may be applied to the bead 510 to be provided along the bead 510 by various techniques, such as screen printing, application with a dispenser, and an inkjet method. The applied liquid rubber is cured to form the gasket 550.

The surface tension of the liquid rubber applied to the bead 510 maintains the shape formed when the liquid rubber is applied, so that the gasket 550 is formed with an intended shape (FIG. 8A). However, the applied liquid rubber can fail to maintain its shape for some reason, resulting in the liquid rubber flowing downward of the bead 510. FIG. 8B shows a state of liquid rubber 560, a portion of which (the portion indicated with 560X in FIG. 8B) has flowed down below the bead 510. In particular, such an incidence tends to occur when the liquid rubber has a low viscosity, or the intended height t is high. The gasket 550 cannot have the intended size and shape when the liquid rubber flows down, resulting in a defective product. This lowers the productivity.

CITATION LIST

Patent Literature

[PTL 1] WO 2007/10914

SUMMARY

Technical Problem

It is an objective of the present disclosure to provide a separator-integrated gasket with improved productivity.

Solution to Problem

The present disclosure adopts the following solutions to achieve the objective.

A separator-integrated gasket according to the present disclosure includes a separator main body for a fuel cell and an elastic gasket that is integral with the separator main body. The separator main body includes a bead and a pair of protrusions located on opposite sides of the bead to block liquid rubber applied to the bead. The gasket is formed when the liquid rubber is cured.

According to the present disclosure, when liquid rubber is applied to the bead, the pair of protrusions blocks the liquid rubber, reducing the likelihood that the liquid rubber flows further downward. This allows the liquid rubber on the bead to have regular size and shape.

The gasket may cover the boundary section between the bead and each protrusion.

The gasket may also cover the entire protrusions.

In this configuration, the separator main body resists deformation when the gasket is compressed. This helps to prevent the gasket from peeling off from the separator main body.

The separator main body may include a stepped protruding section protruding from a flat section. The section in the center in the width direction of the stepped protruding section may be the bead. The two sections in the stepped protruding section that are located on opposite sides of the bead and lower in height than the bead may be the pair of protrusions.

In another example, the separator main body may include three protruding sections that protrude from a flat section and are adjacent to one another. One of the three protruding sections that is located in the center may be the bead. The two protruding sections that are located on opposite sides of the bead and lower in height than the bead may be the pair of protrusions.

At least one pair of auxiliary protrusions capable of blocking the liquid rubber may be provided, and the bead and the pair of protrusions may be located between the auxiliary protrusions.

This allows the liquid rubber to be blocked in multiple stages, so that the liquid rubber on the beads is more likely to have regular shape and size.

Advantageous Effects of the Disclosure

As described above, the productivity of the separator-integrated gasket can be improved.

DRAWINGS

DETAILED DESCRIPTION

Figure 1:
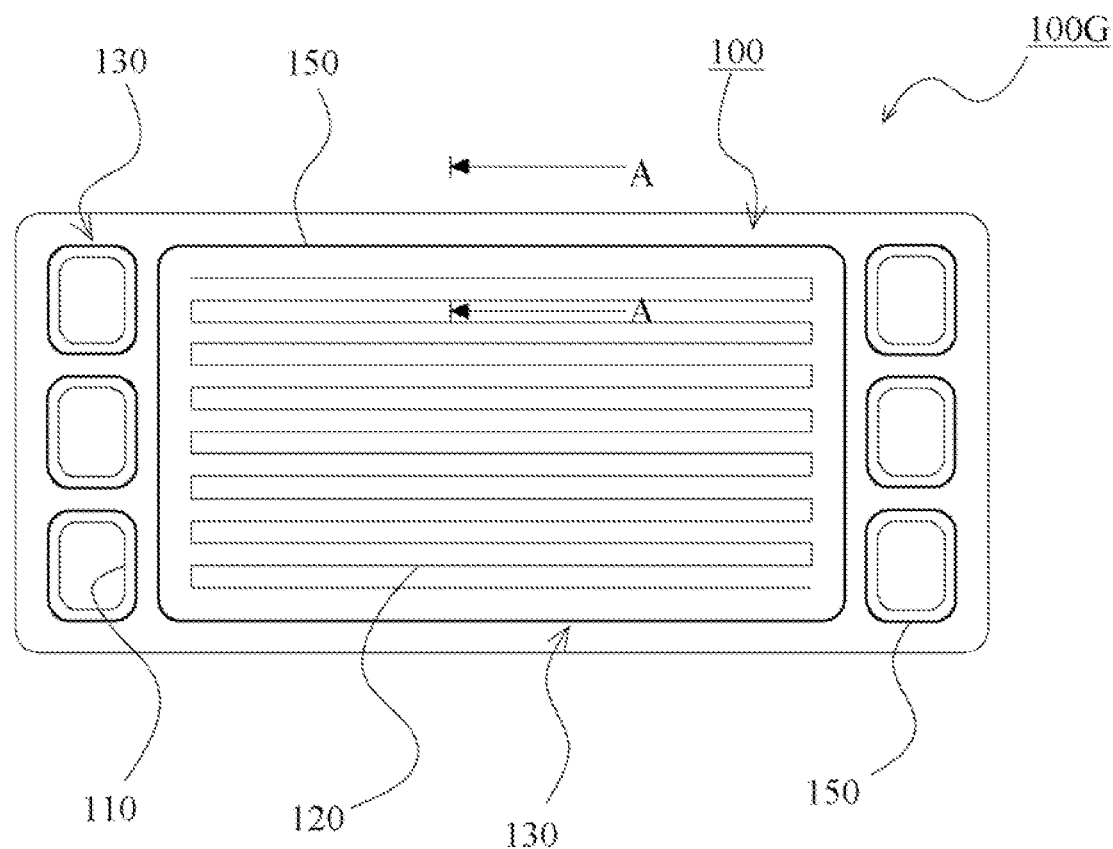
FIG. 1 is a plan view of a separator-integrated gasket of a first embodiment.

Referring to the drawings, embodiments according to the present disclosure are illustrated based on examples. However, the dimensions, materials, shapes, relative arrangements, and the like of the components described in these embodiments are not intended to limit the scope of the present disclosure thereto unless otherwise specified.

First Embodiment

Figure 2:
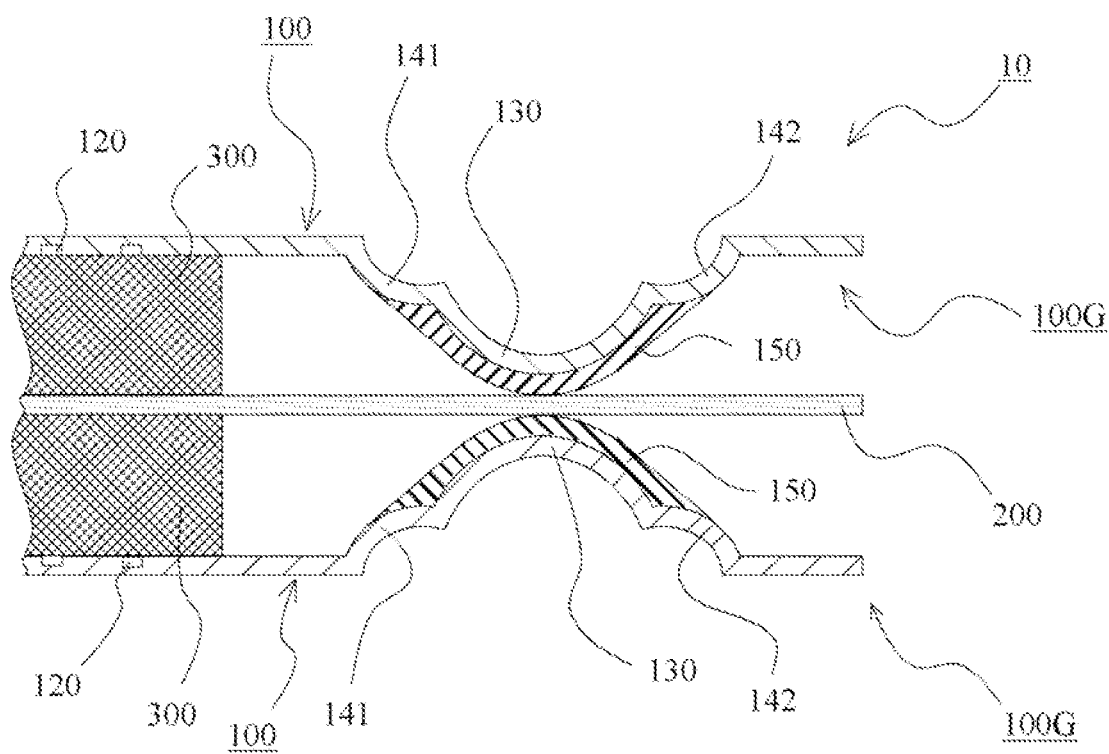
FIG. 2 is a schematic cross-sectional view showing a part of a fuel cell of the first embodiment.
Figure 3A:
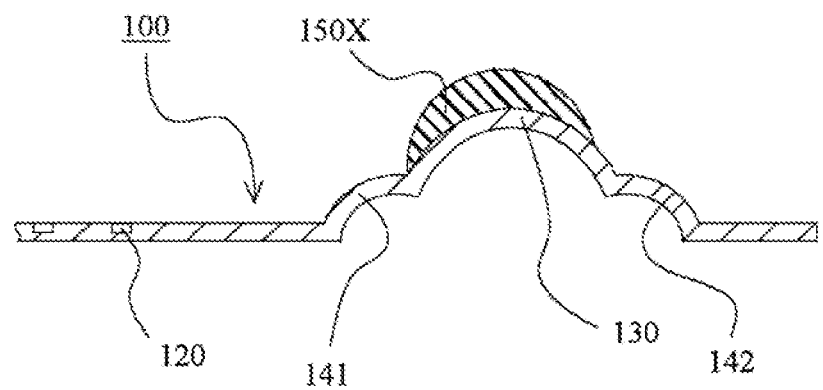
FIGS. 3A to 3C are diagrams illustrating a manufacturing process of the separator-integrated gasket of the first embodiment.
Figure 3B:
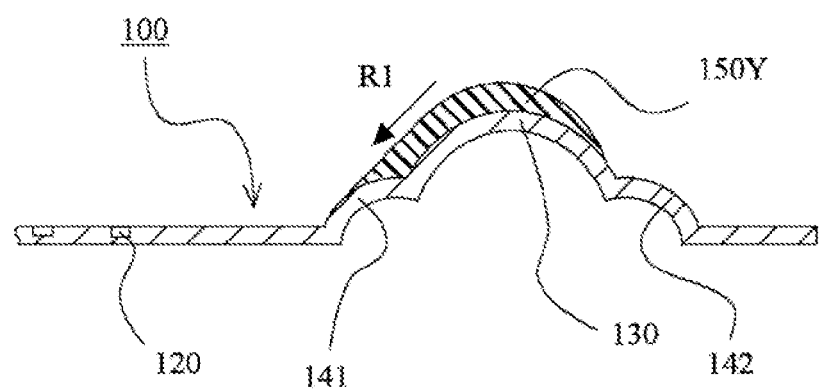
Figure 3C:
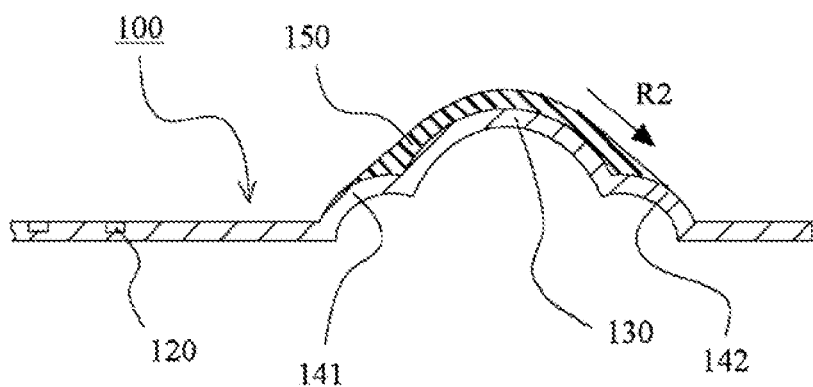

Referring to FIGS. 1, 2 and 3A to 3C, a separator-integrated gasket of a first embodiment is now described. FIG. 1 is a plan view of a separator-integrated gasket of the first embodiment. FIG. 2 is a schematic cross-sectional view showing a part of a fuel cell of the first embodiment. In a pair of separator-integrated gaskets 100G shown in FIG. 2, the one illustrated lower than the other shows a cross-sectional view of the separator-integrated gasket 100G taken along line A-A in FIG. 1. FIGS. 3A to 3C are diagrams illustrating a manufacturing process of the separator-integrated gasket of the first embodiment. FIGS. 3A to 3C show a cross-sectional view of a separator main body 100 taken along line A-A in FIG. 1.

Fuel Cell

Referring to FIG. 2, a fuel cell is now described that has the separator-integrated gaskets 100G. A typical fuel cell is configured as a cell stack consisting of a plurality of single cells. FIG. 2 is a schematic cross-sectional view of a single cell 10. The single cell 10 includes a pair of separator-integrated gaskets 100G and a membrane electrode assembly (MEA) provided between the separator-integrated gaskets 100G. The MEA includes an electrolyte membrane 200 and a pair of gas-diffusion layers 300 located on opposite sides of the electrolyte membrane 200.

Separator-Integrated Gasket

Referring to FIGS. 1 and 2, the separator-integrated gaskets 100G provided in the fuel cell (single cell 10) are now described in detail. Each separator-integrated gasket 100G includes a separator main body 100 for a fuel cell and elastic gaskets 150, which are elastic bodies formed integrally with the separator main body 100. The separator main body 100 is a plate-shaped member, which may be made of metal. The separator main body 100 may be made of other materials, such as carbon and resin. The separator main body 100 includes a plurality of manifolds 110 and a flow passage 120 formed on the surface of the separator main body 100. The manifolds 110 are provided in the separator main body 100 to distribute fuel gas, oxidant gas, coolant, and the like to the cells. The flow passage 120 formed on the surface of the separator main body 100 is used as a flow path for fuel gas, oxidant gas, and the like.

To prevent the fuel gas or the like from leaking to the outside, the elastic gaskets 150 are formed integrally with the separator main body 100 at locations around the manifolds 110 and around the region where the flow passage 120 is formed. The bold lines in FIG. 1 indicate the sections where the gaskets 150 are formed. To enhance the sealing property, the separator main body 100 includes beads 130, on which the gaskets 150 are formed. The separator main body 100 includes beads 130 formed around the manifolds 110 and around the region where the flow passage 120 is formed, and the elastic gaskets 150 are formed on the respective beads 130. The material of the gaskets 150 may be silicone rubber, fluororubber, EPDM, and butyl rubber. The gaskets 150 seal the gaps between the separator main body 100 and the electrolyte membrane 200.

Separator Main Body

Referring to FIGS. 2 and 3A to 3C, the separator main body 100 is now described in detail. The separator main body 100 includes beads 130 and a pair of protrusions 141 and 142 located on opposite sides of each bead 130 to block the liquid rubber applied to the bead 130. Specifically, the separator main body 100 includes stepped protruding sections protruding from the flat section. In each stepped protruding section, the section in the center in the width direction is the bead 130, and the two sections that are located on opposite sides in the width direction of the bead 130 and lower in height than the bead 130 are the pair of protrusions 141 and 142. The pair of protrusions 141 and 142 may have a width of 20 μm to 500 μm and a height (amount of protrusion from the flat surface) of 100 μm to 500 μm, though it depends on the plan layout of the separator main body 100.

Gasket Forming Method

Referring to FIGS. 3A to 3C, a method for forming the gasket 150 is now described. The method for forming the gasket 150 generally includes a step of applying liquid rubber to a bead 130 of the separator main body 100 and a step of curing the applied liquid rubber by cross-linking. In the "step of applying liquid rubber" of this embodiment, various techniques such as screen printing, application with a dispenser, and an inkjet method may be used to apply liquid rubber.

When the liquid rubber applied to a bead 130 of the separator main body 100 is off-center toward one side from the center in the width direction of the bead 130, the liquid rubber flows downward to this side of the bead 130. FIG. 3A shows a case where the liquid rubber is off-center to the left as viewed in FIG. 3A from the center in the width direction of the bead 130. As shown here, one of the two protrusions 141 and 142 blocks the liquid rubber flowing downward to one side in the width direction of the bead 130. In the example shown in FIGS. 3A to 3C, the liquid rubber flows down in the direction of arrow R1 and is then blocked by the protrusion 141 on the left side as viewed in FIG. 3B.

After one of the protrusions 141 and 142 blocks the liquid rubber, the liquid rubber flows toward the other of the protrusions 141 and 142, which then blocks the liquid rubber. In the example shown in FIGS. 3A to 3C, after being blocked by the protrusion 141, the liquid rubber flows to the right side as viewed in FIG. 3C (in the direction of arrow R2) and is blocked by the right protrusion 142. Then, the liquid rubber is cured by cross-linking to form the gasket 150 as described above (see FIG. 3C). The gasket 150 formed in this manner covers the boundary sections between the bead 130 and the protrusions 141 and 142.

Advantages of Separator-Integrated Gasket of Present Embodiment

When liquid rubber is applied to the bead 130, the pair of protrusions 141 and 142 of the separator-integrated gasket 100G blocks the liquid rubber, reducing the likelihood that the liquid rubber flows further downward. This allows the liquid rubber on the bead 130 to have regular size and shape. The productivity is thus improved.

Second Embodiment

Figure 4:
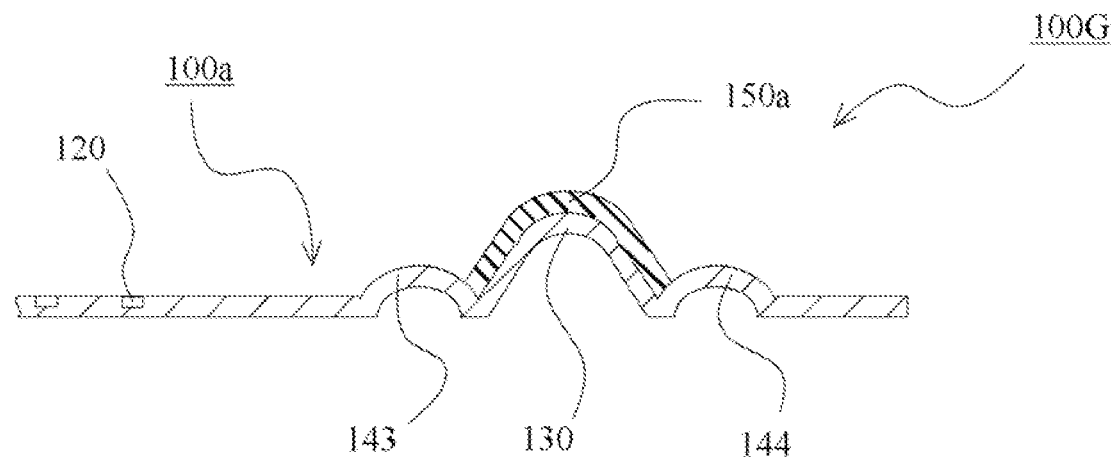
FIG. 4 is a schematic cross-sectional view of a separator-integrated gasket of a second embodiment.

FIG. 4 shows a second embodiment. This embodiment differs from the first embodiment in the configuration of the bead and the pair of protrusions. The description of the first embodiment may be applicable to this embodiment as to the other configurations and operations. Same reference numerals are given to corresponding components, and the descriptions thereof are omitted.

FIG. 4 is a schematic cross-sectional view of a separator-integrated gasket of the second embodiment. FIG. 4 corresponds to a cross-sectional view taken along line A-A in FIG. 1. The separator-integrated gasket 100G includes a separator main body 100a for a fuel cell and elastic gaskets 150a formed integrally with the separator main body 100a as in the first embodiment.

The separator main body 100a includes beads 130 and a pair of protrusions 143 and 144 located on opposite sides of each bead 130 to block the liquid rubber applied to the bead 130. Specifically, the separator main body 100a includes three protruding sections that protrude from the flat section and are adjacent to one another. Of these three protruding sections, the protruding section in the center is the bead 130, and the two protruding sections that are located on opposite sides of the bead 130 and lower in height than the bead 130 are the pair of protrusions 143 and 144.

The description of the first embodiment may be applicable to this embodiment as to the materials and the like of the separator main body 100a and the gasket 150a, and the description thereof is omitted. The separator main body 100a includes beads 130 formed around the manifolds 110 and around the region where the flow passage 120 is formed, and the elastic gaskets 150a are formed on the respective beads 130, in a manner similar to the first embodiment. The description of the first embodiment may be applicable to this embodiment as to the method for forming the gasket 150a, and the description thereof is omitted.

With the separator-integrated gasket 100G, when liquid rubber is applied to the bead 130, the pair of protrusions 143 and 144 blocks the liquid rubber, reducing the likelihood that the liquid rubber flows further downward. This allows the liquid rubber on the bead 130 to have regular size and shape.

Third Embodiment

Figure 5:
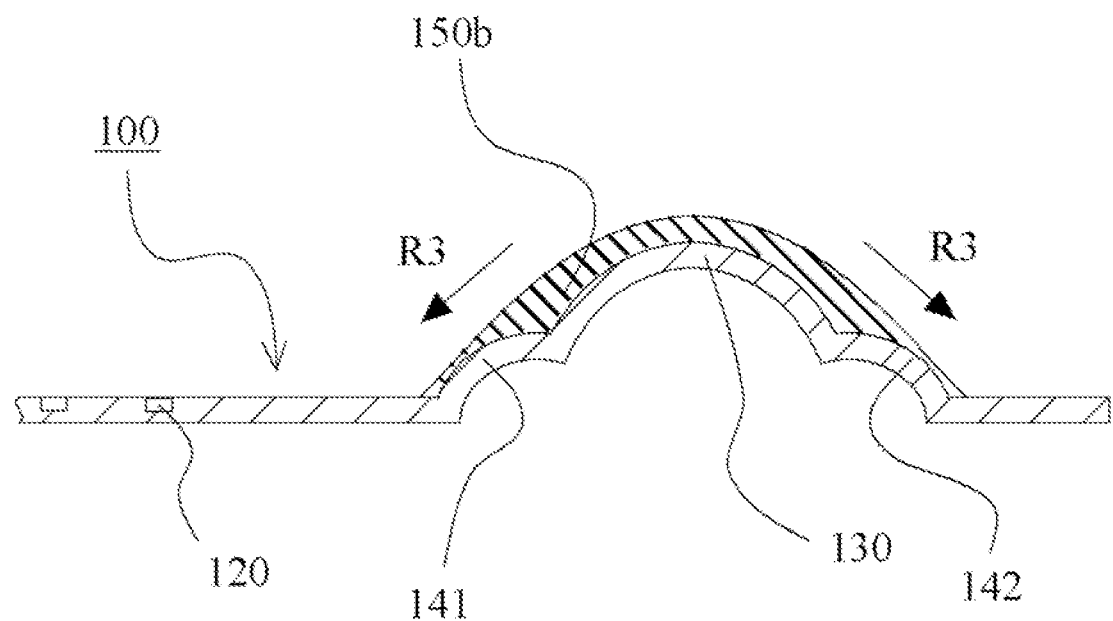
FIG. 5 is a schematic cross-sectional view of a separator-integrated gasket of a third embodiment.

FIG. 5 shows a third embodiment. This embodiment differs from the first embodiment in the configuration of the gasket. The other configurations and operations are similar to those of the first embodiment. Same reference numerals are given to corresponding components, and the descriptions thereof are omitted.

FIG. 5 is a schematic cross-sectional view of the separator-integrated gasket of the third embodiment. FIG. 5 corresponds to a cross-sectional view taken along line A-A in FIG. 1. In a manner similar to the first embodiment, the separator-integrated gasket 100G includes a separator main body 100 for a fuel cell and elastic gaskets 150b formed integrally with the separator main body 100.

The configuration of the separator main body 100 is similar to that of the first embodiment, and the description thereof is omitted. The gasket 150b covers the entire protrusions 141 and 142 of the separator main body 100. That is, in the present embodiment, a greater amount of liquid rubber is applied to the bead 130 than in the first embodiment. Accordingly, after being blocked by both of the protrusions 141 and 142 as described above (FIG. 3C), the liquid rubber flows beyond these protrusions 141 and 142 (as indicated by arrows R3 in FIG. 5). The liquid rubber is then cured by cross-linking to form the gasket 150b. FIG. 5 shows a state after the gasket 150b is formed. In the present embodiment, when liquid rubber is applied to the bead 130, the liquid rubber still undergoes a process of being blocked by the pair of protrusions 141 and 142. This allows the liquid rubber on the bead 130 to have regular size and shape. The present embodiment thus has the advantage as the first embodiment.

Moreover, since the gasket 150b covers the entire protrusions 141 and 142, the separator main body 100 resists deformation when the gasket 150b is compressed. This helps to prevent the gasket 150b from peeling off from the separator main body 100.

The description of the first embodiment may be applicable to this embodiment as to the materials and the like of the separator main body 100 and the gasket 150b, and the description thereof is omitted. The separator main body 100 includes beads 130 formed around the manifolds and around the region where the flow passage 120 is formed, and the elastic gaskets 150b are formed on the respective beads 130, in a manner similar to the first embodiment.

Fourth Embodiment

Figure 6:
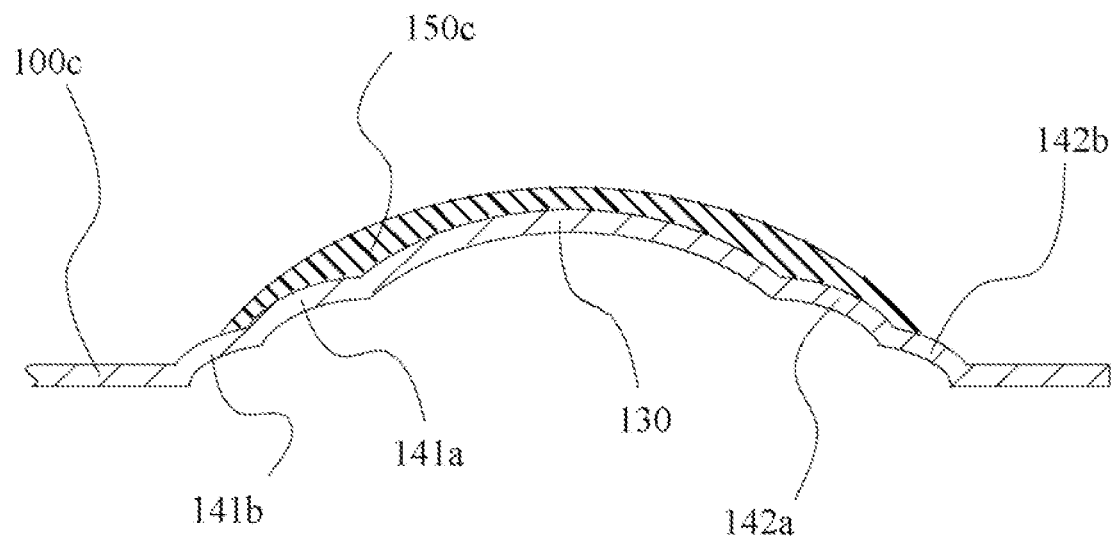
FIG. 6 is a schematic cross-sectional view of a separator-integrated gasket of a fourth embodiment.

FIG. 6 shows a fourth embodiment. In this embodiment, the separator main body includes a pair of auxiliary protrusions capable of blocking the liquid rubber, and the bead and the pair of protrusions are located between these auxiliary protrusions. The description of the first embodiment may be applicable to this embodiment as to as to the other configurations and operations. Same reference numerals are given to corresponding components, and the descriptions thereof are omitted.

FIG. 6 is a schematic cross-sectional view of the separator-integrated gasket of the fourth embodiment. FIG. 6 corresponds to a cross-sectional view taken along line A-A in FIG. 1. The separator-integrated gasket 100G includes a separator main body 100c for a fuel cell and elastic gaskets 150c formed integrally with the separator main body 100c as in the first embodiment.

The separator main body 100c includes beads 130 and a pair of protrusions 141a and 142a located on opposite sides of each bead 130 to block the liquid rubber applied to the bead 130. The separator main body 100c further includes a pair of auxiliary protrusions 141b and 142b capable of blocking the liquid rubber, and the bead 130 and the pair of protrusions 141a and 142a are located between these auxiliary protrusions 141b and 142b.

The description of the first embodiment may be applicable to this embodiment as to the materials and the like of the separator main body 100c and the gasket 150c, and the description thereof is omitted. The separator main body 100c includes beads 130 formed around the manifolds and around the region where the flow passage 120 is formed, and the elastic gaskets 150c are formed on the respective beads 130, in a manner similar to the first embodiment.

The description of the third embodiment may be applicable to this embodiment as to the method for forming the gasket 150c. By adopting the forming method as described in the third embodiment, the liquid rubber is blocked by the pair of auxiliary protrusions 141b and 142b and thus covers the entire protrusions 141a and 142a. This embodiment therefore has the advantage described in the third embodiment. Moreover, in the present embodiment, the liquid rubber applied to the bead 130 is blocked by the pair of protrusions 141a and 142a and then blocked again by the pair of auxiliary protrusions 141b and 142b. Consequently, the liquid rubber on the bead 130 is more likely to have regular shape and size.

The present embodiment includes one pair of auxiliary protrusions 141b and 142b, but two or more pairs of auxiliary protrusions may be provided, and the bead and the pair of protrusions may be located between auxiliary protrusions of each pair. This allows the liquid rubber to be blocked in multiple stages, so that the liquid rubber on the beads is more likely to have regular shape and size.

Fifth Embodiment

Figure 7:
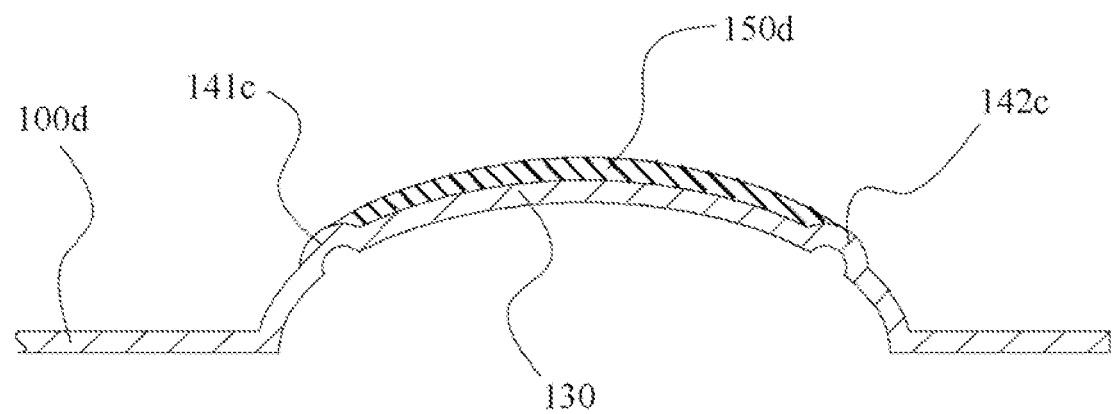
FIG. 7 is a schematic cross-sectional view of a separator-integrated gasket of a fifth embodiment.
Figure 8A:
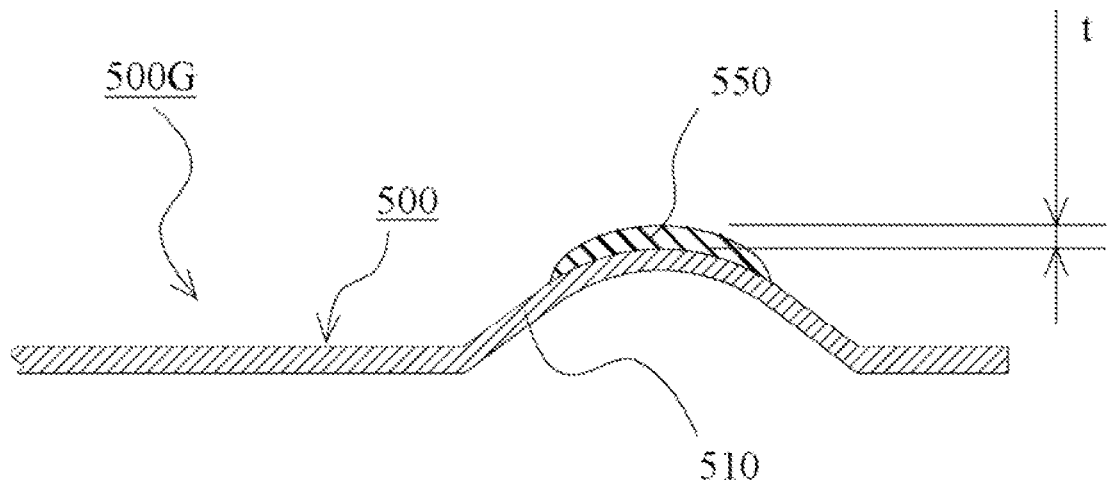
FIGS. 8A and 8B are schematic cross-sectional views of separator-integrated gaskets of a conventional example.
Figure 8B:
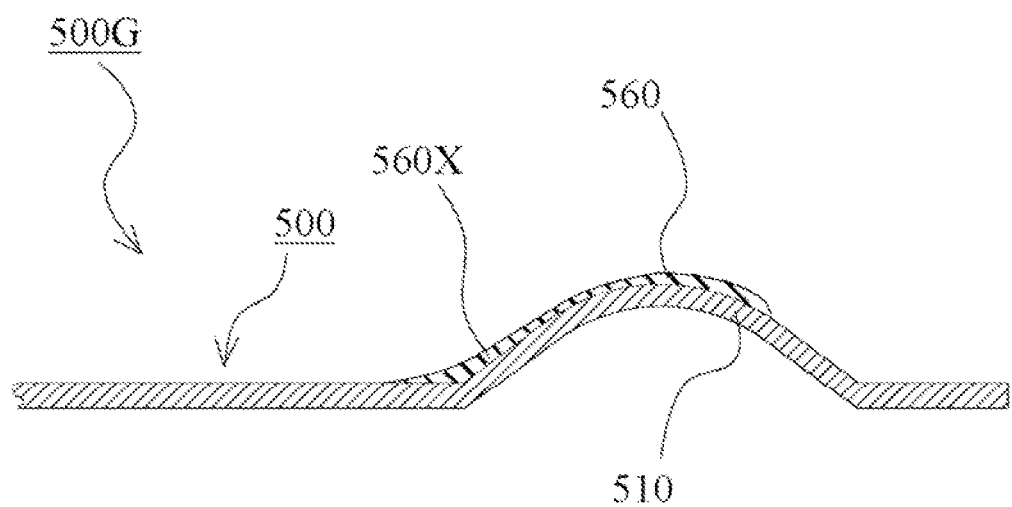

FIG. 7 shows a fifth embodiment. This embodiment differs from the first embodiment in the configuration of the bead and the pair of protrusions. The description of the first embodiment may be applicable to this embodiment as to the other configurations and operations. Same reference numerals are given to corresponding components, and the descriptions thereof are omitted.

FIG. 7 is a schematic cross-sectional view of the separator-integrated gasket of the fifth embodiment. FIG. 7 corresponds to a cross-sectional view taken along line A-A in FIG. 1. The separator-integrated gasket 100G includes a separator main body 100d for a fuel cell and elastic gaskets 150d formed integrally with the separator main body 100d as in the first embodiment.

The separator main body 100d includes beads 130 and a pair of protrusions 141c and 142c located on opposite sides of each bead 130 to block the liquid rubber applied to the bead 130. The present embodiment differs from the first embodiment, in which the pair of protrusions 141 and 142 protrudes from the flat section, in that the pair of protrusions 141c and 142c is formed within a section protruding from the flat section. The bead 130 is located in the center of the protruding section as in the first embodiment.

The description of the first embodiment may be applicable to this embodiment as to the materials and the like of the separator main body 100d and the gasket 150d, and the description thereof is omitted. The separator main body 100d includes beads 130 formed around the manifolds and around the region where the flow passage 120 is formed, and the elastic gaskets 150d are formed on the respective beads 130 as in the first embodiment. The description of the first embodiment may be applicable to this embodiment as to the method for forming the gasket 150d, and the description thereof is omitted.

According to the separator-integrated gasket 100G, when liquid rubber is applied to the bead 130, the pair of protrusions 141c and 142c blocks the liquid rubber, reducing the likelihood that the liquid rubber flows further downward. This allows the liquid rubber on the bead 130 to have regular size and shape.

REFERENCE SIGNS LIST 10 single cell
100G separator-integrated gasket
100, 100a, 100c, 100d separator main body
110 manifold
120 flow passage
130 bead
141, 142, 141a, 142a, 141c, 142c, 143, 144 protrusion
141b, 142b auxiliary protrusion
150, 150a, 150b, 150c, 150d gasket
200 electrolyte membrane
300 gas-diffusion layer

What is claimed is:

1. A separator-integrated gasket comprising:
a separator main body for a fuel cell; and
an elastic gasket that is integral with the separator main body, wherein
the separator main body includes a stepped protruding section protruding from a flat section thereof, the stepped protruding section having a bead with a convex shape protruding toward a same direction as the stepped protruding section and a pair of protrusions protruding toward the same direction as the bead located directly adjacent opposite sides of the bead
the pair of protrusions are formed so that an amount of protrusion of the pair of protrusions from the surface of the flat section of the separator main body does not increase as the distance from a center part of the bead increases,
liquid rubber applied to the bead is blocked by the protrusions, and
the elastic gasket is formed when the liquid rubber is cured and covers a boundary section between the bead and each of the pair of protrusions.

2. The separator-integrated gasket according to claim 1, wherein the gasket covers the entire protrusions.

3. The separator-integrated gasket according to claim 1, wherein the bead is located in a center in a width direction of the stepped protruding section, and the pair of protrusions are lower in height than the bead.

4. The separator-integrated gasket according to claim 1, wherein at least one pair of auxiliary protrusions capable of blocking the liquid rubber is provided, and the bead and the pair of protrusions are located between the auxiliary protrusions.

* * * * *